United States Patent
Tengler et al.

(12) 
(10) Patent No.: US 7,005,977 B1
(45) Date of Patent: Feb. 28, 2006

(54) SYSTEM AND METHOD FOR PROVIDING WIRELESS COMMUNICATION BETWEEN VEHICLES

(75) Inventors: Steve Tengler, Grosse Pointe Park, MI (US); Ron Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/094,321

(22) Filed: Mar. 31, 2005

(51) Int. Cl.
*B60Q 1/00* (2006.01)

(52) U.S. Cl. .................. 340/457.2; 340/457; 340/933; 340/942; 340/458

(58) Field of Classification Search ............ 340/457.2, 340/457, 933, 942, 458, 468, 471
See application file for complete search history.

(56) References Cited

U.S. PATENT DOCUMENTS

| | | | | |
|---|---|---|---|---|
| 6,275,145 | B1 * | 8/2001 | Rogozinski | 340/425.5 |
| 6,278,360 | B1 * | 8/2001 | Yanagi | 340/436 |

\* cited by examiner

*Primary Examiner*—Daryl C. Pope
(74) *Attorney, Agent, or Firm*—Foley & Lardner LLP

(57) ABSTRACT

A vehicle and a method for controlling headlight status in a first vehicle includes receiving status information from at least one vehicle other than the first vehicle located in a communication area surrounding the first vehicle, the status information including a headlight status of the at least one other vehicle. A headlight status of the first vehicle is determined, and an action is initiated in the first vehicle based on the determined headlight status of the first vehicle and the received vehicle status of the at least one vehicle.

32 Claims, 2 Drawing Sheets

US 7,005,977 B1

SYSTEM AND METHOD FOR PROVIDING WIRELESS COMMUNICATION BETWEEN VEHICLES

FIELD OF THE INVENTION

The present invention relates generally to motor vehicles and, more particularly, to a system and method for providing wireless communication between vehicles.

BACKGROUND OF THE INVENTION

Many currently available automobiles offer an ambient light detection system that controls the on/off setting of the headlights. In particular, if the detected ambient light is below a certain threshold, then the headlights are turned on. Otherwise, the headlights remain off. In the absence of such a detection system, the driver manually turns the headlights on or off, such as with a switch or knob on the dashboard of the automobile.

In some situations where the headlights should be turned on, the driver may fail or forget to do so. For example, if the driver starts the vehicle in a very well lit parking lot or garage or is driving in a very well lit area of a city, the absence of the headlights may not be noticeable. A driver may similarly forget to turn on the headlights when there is precipitation, such as snow or rain. By failing to turn on the headlights at a time when they should be on, the driver may not have optimum visibility. In particular, without the headlights on, other drivers may be unable to discern the presence of the vehicle, which can result in an accident and injuries to nearby drivers, passengers, and pedestrians.

SUMMARY OF THE INVENTION

Accordingly, it would be desirable to have a system for turning headlights on in certain situations.

According to an aspect of the invention, a vehicle and a method for controlling headlight status in a first vehicle includes receiving status information from at least one vehicle other than the first vehicle located in a communication area surrounding the first vehicle, the status information including a headlight status of the at least one vehicle. A headlight status of the first vehicle is determined, and an action is initiated in the first vehicle based on the determined headlight status of the first vehicle and the received vehicle status of the at least one other vehicle.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Wireless communication between vehicles and to and from other structures and devices can provide for a significant increase in the amount and types of information available to vehicles and drivers, as well as the potential for a variety of new applications and systems ranging from crash avoidance to Internet entertainment systems. Systems such as telephony and Dedicated Short Range Communications (DSRC) are capable of supporting wireless communication between vehicles. For example, using a DSRC system, each vehicle is capable of generating and broadcasting a "Common Message Set" (CMS), which provides each vehicle's relevant kinematical and location information such as GPS/vehicle position, velocity, vehicular dimensions, and other related information. In addition, status information, such as headlight status (e.g., On, High Beams, Parking Lamps, Off) can also be provided. The DSRC system can broadcast messages between vehicles using a frequency between about 5 and 6 GHz.

The CMS message can be broadcast as the most frequent message on the control or center channel of the DSRC band, although other messages can also be broadcast over this channel. Unicast messages (i.e., single-sender speaking directly to a single-receiver for mono-to-mono exchanges) can be directed to an alternate channel, and several channels can be designated as either urgent/safety-related channels or service-providing, non-urgent channels. This type of implementation permits OEM's to send messages only to vehicles of the same manufacturer or make, and create exchanges of information between them outside the central channel of communication.

Figure 1:
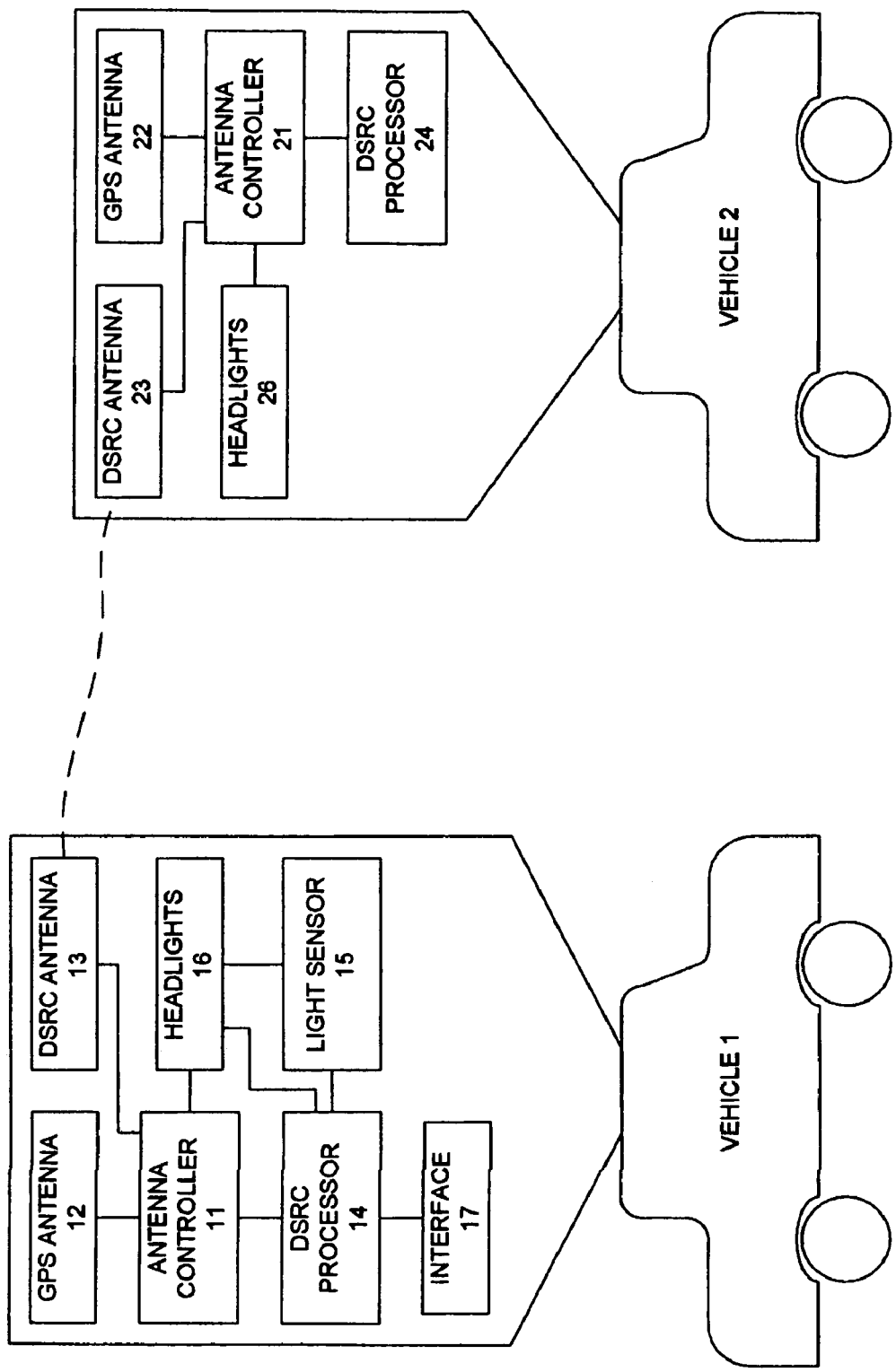
FIG. 1 is a block diagram of a headlight control system consistent with the present invention.

In view of this ability for information to be communicated between vehicles, it is possible to configure a system that enables a vehicle to modify its operation or settings and to notify a driver of settings, situations or conditions relevant to operating a vehicle. For example, it is possible to use information about the headlight status of vehicles to adjust the headlight setting of another vehicle. FIG. 1 is a block diagram of a headlight control system consistent with the present invention. As shown in FIG. 1, there is a vehicle 1 and a vehicle 2. The vehicle 1 includes an antenna controller 11, a GPS antenna 12, a DSRC antenna 13, a DSRC processor 14, a light sensor 15, headlights 16, and an interface 17. The vehicle 2 has similar elements including an antenna controller 21, a GPS antenna 22, a DSRC antenna 23, a DSRC processor 24, and headlights 26. Although the vehicle 2 is not shown as including a light sensor or an interface, the vehicle 2 can also include these elements. In addition, although only the two vehicles 1 and 2 are shown, it should be understood that the headlight control system is applicable to more than two vehicles.

The antenna controller 11 controls the functioning of both the GPS antenna 12 and the DSRC antenna 13. The GPS antenna 12 is configured to receive information regarding the location of the vehicle 1. The DSRC antenna 13 is configured to receive information from other vehicles and devices and to transmit information from the vehicle 1. The received information and the transmitted information can include, for example, kinematical and location information such as GPS/vehicle position, velocity, and vehicular dimensions, as well as status information, such as headlight status. The information can be transmitted and received in a predetermined message format such as the CMS. The predetermined message format may be unique to each manufacturer or be a common format for all vehicles. Even in the common format, the predetermined message may include a section or component identifying the manufacturer, which can enable a vehicle to send a message exclusively to other vehicles of the same manufacturer or make.

To transmit a message or other information, the DSRC antenna 13 receives control instructions from the antenna controller 11 and transmits the message in accordance with the control instructions. Messages or other information received by the GPS antenna 12 and the DSRC antenna 13 are provided to the antenna controller 11. In response to the received message, the antenna controller 11 can provide new control instructions to the GPS antenna 12 and the DSRC antenna 13 based on the content of the received message. In addition, the antenna controller provides the received message to the DSRC processor 14.

The DSRC processor 14 is configured to process messages provided from the antenna controller 11 and to generate messages to be transmitted by the DSRC antenna 13. The DSRC processor 14 is also configured to control the setting of the headlights 16 and to provide signals and messages to the interface 17. The DSRC processor 14 can include a processing unit, such as CPU or microprocessor, a non-volatile storage medium, such as an NVRAM or ROM, and a volatile storage medium, such as RAM. The non-volatile storage preferably includes instructions executed by the processing unit to perform the message processing and generation and other control functions, as will be described in more detail herein.

The light sensor 15 is configured to detect ambient light external to the vehicle 1. The light sensor 15 converts the detected ambient light into an electrical signal and provides the signal to the DSRC processor 14 and to the headlights 15. The DSRC processor 14 uses the signal from the light sensor 15 as part of its message processing and generation and its control functions. The headlights 16 are lamps at the front of the vehicle 1 that illuminate the environment ahead of the vehicle 1.

The interface 17 receives messages or signals from the DSRC 14 and provides information to the driver based on the received messages or signals. The information provided by the interface 17 to the driver can include, for example, location, velocity, mileage, etc. The interface 17 can also provide information to the user based on messages provided from other vehicles, such as velocity and location. The data provided by the interface 17 to the driver, for example, can be communicated through a visual display showing text, graphical, and/or analog data. The interface 17 can also provide information to the driver audibly through a recorded or computerized voice. In addition to receiving data from the DSRC processor, the interface 17 can also provide data to the DSRC processor 14, such as velocity and other operational conditions of the vehicle 1 that can be detected by various sensors implemented in the vehicle 1.

The components of the vehicle 2 are implemented and operate in the same manner as the corresponding components of the vehicle 1. In particular, the antenna controller 21, the GPS antenna 22, the DSRC antenna 23, the DSRC processor 24, and the headlights 26 are implemented and operate in the same manner as the antenna controller 11, the GPS antenna 12, the DSRC antenna 13, the DSRC processor 14, and the headlights 16, respectively.

Figure 2:
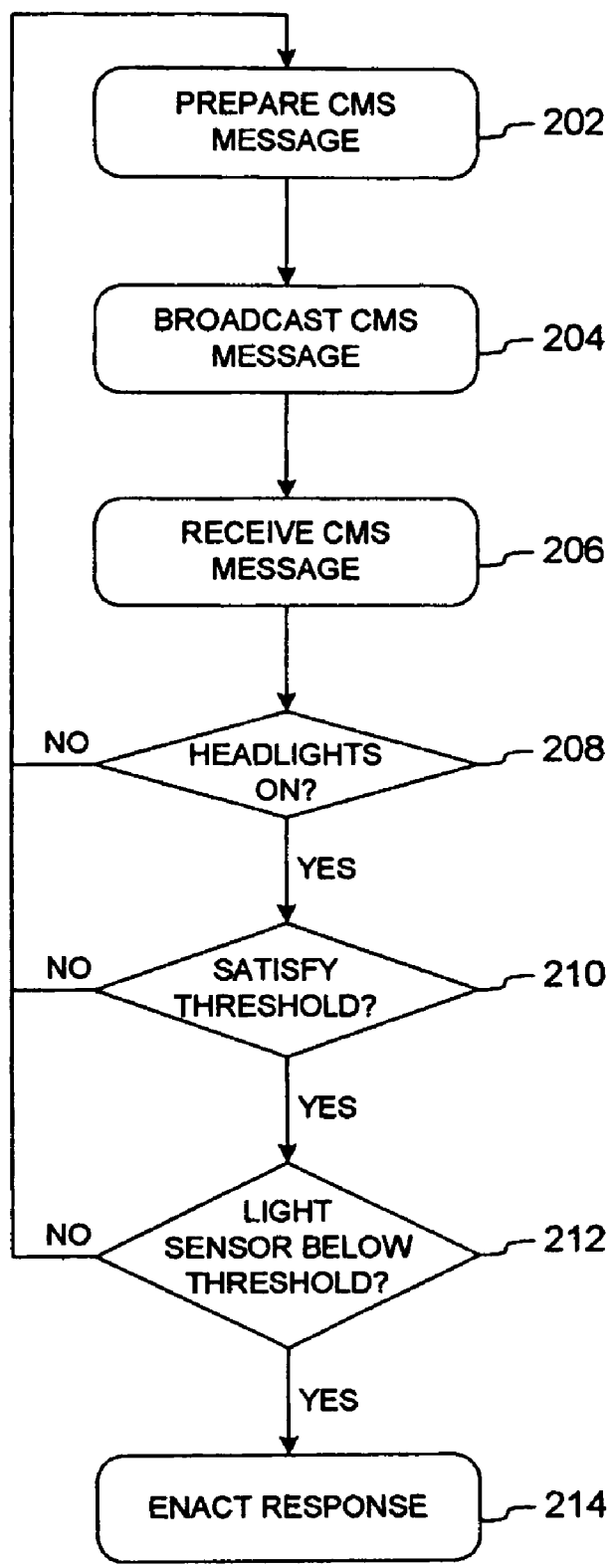
FIG. 2 is a flow diagram of a headlight control process consistent with the present invention.

FIG. 2 is a flow diagram of a headlight control process consistent with the present invention. In the following description, the process is described in conjunction with the vehicles 1 and 2 of FIG. 1. More specifically, the process is described from the standpoint of a message being transmitted from vehicle 2 and received by vehicle 1, which responds to the received message. It is also assumed that the headlights 16 of the vehicle 1 are off. It should be understood, however, that the process is applicable to any vehicle capable of communicating wirelessly with other vehicles or transmitters.

As shown in FIG. 2, in the headlight control process, the vehicle 2 first prepares a CMS message (step 202). As described above, the CMS message can include kinematical and location information such as GPS/vehicle position, velocity, and vehicular dimensions, as well as status information, such as headlight status. With reference to FIG. 1, the DSRC processor 24 of the vehicle 2 collects the information for forming the CMS message. The information collected includes, for example, a status of the headlights 26, velocity data from a velocity sensor, location information received by the GPS antenna 22, and other relevant information about the operation and settings of the vehicle 2. The collected information is formatted into the CMS message format. Although the CMS message format is preferable, other message formats, either common to all automobile manufacturers or unique to particular manufacturers can be used instead. Further, in addition to the collected information, the message is formatted to include a unique identifier for the vehicle 2 so that other vehicles receiving the message can distinguish the origin of the message from messages received from other vehicles. The CMS message can be prepared at predetermined time intervals, such as every minute.

The vehicle 2 broadcasts the CMS message (step 204). To broadcast the message, the DSRC processor 24 provides the CMS message to the antenna controller 21, which controls the DSRC antenna 23 to broadcast the message. The CMS message is broadcast at least to vehicles in the vicinity of the vehicle 2. Additionally, the CMS message can be broadcast to other structures, such as antenna towers or other communication devices, which can forward or broadcast the CMS message to more vehicles that may be outside of the broadcast range of the DSRC antenna 23.

The vehicles in the broadcast range of the DSRC antenna 23, including the vehicle 1, receive the CMS message from the vehicle 2 (step 206). At vehicle 1, the CMS message is received by the DSRC antenna 13 and provided to the antenna controller 11, which transfers the message to the DSRC processor 14. The DSRC processor 14 is configured to understand the format and content of the received CMS message and to process it accordingly.

The received CMS message includes an identifier of the vehicle transmitting the CMS message, in this case vehicle 2. The identifier enables the DSRC processor 14 to distinguish which vehicle sent the CMS message and to collect the most up-to-date information about each vehicle transmitting CMS messages to the vehicle 1. The information from the CMS messages can be stored in a memory coupled to or implemented in the DSRC processor 14. When a new CMS message is received, the DSRC processor 14 can update the information stored in the memory or, if it is the first CMS message received from a vehicle, store all of the information in the memory. The information can be stored, for example, in the form of a spreadsheet or table with a line for each vehicle, each line having the identifier of the vehicle and some or all of the information in the CMS message. Accordingly, for each vehicle sending a CMS message to the vehicle 1, the DSRC processor 14 may store each vehicle's location, speed, dimensions and other status settings, such as headlights.

In response to the received CMS message, the DSRC processor 14 determines if the CMS message indicates that the headlights 26 of the vehicle 2 are on (step 208). If they are not on, then the DSRC processor 14 can check if information is already stored for the vehicle 2 and update the status of the headlights. If the headlights 26 of the vehicle 2 are on, however, the DSRC processor 14 can increment a headlight counter, which keeps track of the number of vehicles that have their headlights on. The DSRC processor 14 can also keep a total counter, which keeps track of the number of vehicles that are transmitting CMS messages to the vehicle 1. Both the headlight counter and the total counter can be updated or adjusted to reflect up-to-date information and to account for vehicles no longer transmitting CMS messages to the vehicle 1. For example, if a vehicle has not transmitted a CMS message within a predetermined period, such as five minutes, then the total counter is reduced by one to eliminate that vehicle from the total count, and if that vehicle's headlights were on, then the headlight counter is also reduced by one. Similarly, if a vehicle's headlight status changes from on to off, then the headlight counter is reduced by one.

If the DSRC processor 14 determines that the headlights 26 of the vehicle 2 are on from the received CMS message, then it checks to determine if a threshold is satisfied (step 210). The threshold is used as a test to determine whether or not the headlights 16 of the vehicle 1 should be turned on. The threshold is used in conjunction with the headlight counter or the combination of the headlight counter and the total counter. For example, the threshold could be a predetermined number of vehicles having their headlights on, such as three. Thus, if the headlight counter is equal to or exceeds the predetermined number, then the threshold is satisfied. Alternatively, the threshold could be a predetermined percentage of vehicles having their headlights on, such as 75%. To compare to the threshold, a percentage is calculated by dividing the headlight counter by the total counter (and multiplying by 100). The predetermined percentage may also have a minimum total counter value before the threshold is applied, such as four vehicles sending messages.

If the threshold is not satisfied, then no action is taken. If the threshold is satisfied, then the output of the light sensor 15 is compared to a light threshold (step 212). The light sensor 15 generates an electrical signal indicative of the amount of ambient light outside of the vehicle. If the amplitude of the electrical signal is proportional to the amount of light detected, then the amplitude is greater when it is light out and lower when it is dark out. In this case, if the amplitude is less than or equal to the light threshold, then it is indicative that it is sufficiently dark to turn on the headlights 16. It is also possible for the amplitude to be inversely proportional, in which case a lower amplitude corresponds to it being light and vise versa. If inversely proportional, then if the amplitude is greater than or equal to the light threshold, it is indicative that it is sufficiently dark to turn on the headlights 16.

If the light threshold is not satisfied, then no action is taken. If the light threshold is satisfied, however, then the DSRC processor 14 enacts a response (step 214). There are a number of different responses that can be enacted. For example, one response is for the DSRC processor 14 to turn on the headlights 16 automatically. Alternatively, the DSRC processor 14 can provide an alert to the driver via the interface 17 that the headlights 16 should be turned on. The alert can be made visually by providing a message or signal on a display of the vehicle 1, such as on the dashboard. The alert can also be made audibly, such as through a voice announcement to the interior of the vehicle 1. Another possible response is to cause the parking lamps to periodically flash, which serves as a warning to other drivers in the area, as well as an alert to the driver of the vehicle 1 that the headlights 16 should be turned on. In general, the response should automatically turn on the headlights 16, warn the driver to turn them on, and/or warn other drivers that the headlights 16 of the vehicle 1 are off.

In accordance with the present invention, the headlight status of other vehicles is used to control a vehicle's headlight setting and/or provide a warning. The headlight statuses are communicated to the vehicle through a wireless communication channel. Based on the received headlight statuses, the vehicle can determine whether or not its headlights should be on. For example, if a predetermined number or percentage of other vehicles have their headlights on, then the vehicle can automatically turn its headlights on or advise the driver to do so. Further, before enacting a response based on the received headlight statuses, a light sensor can be used as an additional test to ensure that the ambient light is sufficiently low such that turning on the headlights is appropriate. The use of the light sensor as an additional test is not required. Rather, the response can be enacted based on the received headlight statuses only.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications to enable one skilled in the art to utilize the invention in various embodiments and with various modifications suited to the particular use contemplated. It is intended that the scope of the invention be defined by the claims appended hereto and their equivalents.

What is claimed is:

1. A method for controlling headlight status in a first vehicle, comprising:
   receiving status information from at least one vehicle other than the first vehicle located in a communication area surrounding the first vehicle, the status information including a headlight status of the at least one vehicle;
   determining a headlight status of the first vehicle;
   initiating an action in the first vehicle based on the determined headlight status of the first vehicle and the received status information of the at least one vehicle.

2. A method according to claim 1, wherein initiating an action includes automatically turning on the headlights of the first vehicle if the determined headlight status of the first vehicle indicates that the headlights of the first vehicle are off and the received headlight status of the at least one vehicle indicates that the headlights of the at least one vehicle are on.

3. A method according to claim 1, wherein initiating an action includes providing an alert to a driver of the first vehicle if the determined headlight status of the first vehicle indicates that the headlights of the first vehicle are off and the received headlight status of the at least one vehicle indicates that the headlights of the at least one vehicle are on.

4. A method according to claim 3, wherein the alert indicates that the headlights of the first vehicle should be turned on, and
   wherein the alert is an audible alert or a visual alert.

5. A method according to claim 1, wherein initiating an action includes flashing parking lamps of the first vehicle if the determined headlight status of the first vehicle indicates that the headlights of the first vehicle are off and the received headlight status of the at least one vehicle indicates that the headlights of the at least one vehicle are on.

6. A method according to claim 1, wherein initiating an action includes providing an alert to vehicles in an area proximate to the first vehicle if the determined headlight status of the first vehicle indicates that the headlights of the first vehicle are off and the received headlight status of the at least one vehicle indicates that the headlights of the at least one vehicle are on.

7. A method according to claim 1, wherein the status information is received wirelessly.

8. A method according to claim 7, where the status information is received in conformance with a Dedicated Short Range Communications standard.

9. A method according to claim 7, wherein the status information is received in a format operating between approximately 5 GHz and 6 GHz.

10. A method according to claim 1, wherein an action is initiated if the determined headlight status of the first vehicle indicates that the headlights of the first vehicle are off and the received headlight status of a predetermined number of vehicles indicates that the headlights of the predetermined number of vehicles are on.

11. A method according to claim 10, wherein the predetermined number of vehicles is three vehicles.

12. A method according to claim 1, wherein an action is initiated if the determined headlight status of the first vehicle indicates that the headlights of the first vehicle are off and the received headlight status of a predetermined percentage of the at least one vehicle indicates that the headlights of the predetermined percentage of the at least one vehicle are on.

13. A method according to claim 1, wherein the communication area corresponds to an area surrounding the first vehicle in which the first vehicle is capable of receiving status information from another vehicle.

14. A method according to claim 1, wherein the status information of the at least one vehicle further includes a location and a velocity.

15. A method according to claim 14, wherein the status information of the at least one vehicle further includes vehicle dimensions.

16. A vehicle configured to control a headlight status, comprising:
    headlights configured to be on or off;
    a receiver that receives status information from at least one other vehicle located in a communication area surrounding the vehicle, the status information including a headlight status of the at least one other vehicle; and
    a processor configured to determine a headlight status of the vehicle and to initiate an action based on the determined headlight status of the vehicle and the received status information of the at least one other vehicle.

17. A vehicle according to claim 16, wherein the processor is configured to generate a signal to turn on the headlights of the vehicle automatically if the determined headlight status of the vehicle indicates that the headlights of the vehicle are off and the received headlight status of the at least one other vehicle indicates that the headlights of the at least one other vehicle are on.

18. A vehicle according to claim 16, wherein the processor is configured to generate a signal to provide an alert to a driver of the vehicle if the determined headlight status of the vehicle indicates that the headlights of the vehicle are off and the received headlight status of the at least one other vehicle indicates that the headlights of the at least one other vehicle are on.

19. A vehicle according to claim 18, wherein the alert indicates that the headlights of the vehicle should be turned on, and
wherein the alert is an audible alert or a visual alert.

20. A vehicle according to claim 16, wherein the processor is configured to generate a signal to flash parking lamps of the vehicle if the determined headlight status of the vehicle indicates that the headlights of the vehicle are off and the received headlight status of the at least one other vehicle indicates that the headlights of the at least one other vehicle are on.

21. A vehicle according to claim 16, wherein the processor is configured to generate a signal to provide an alert to vehicles in an area proximate to the vehicle if the determined headlight status of the vehicle indicates that the headlights of the vehicle are off and the received headlight status of the at least one other vehicle indicates that the headlights of the at least one other vehicle are on.

22. A vehicle according to claim 16, wherein the receiver receives the status information wirelessly.

23. A vehicle according to claim 22, where the receiver receives the status information in conformance with a Dedicated Short Range Communications standard.

24. A vehicle according to claim 22, wherein the receiver receives the status information in a format operating between approximately 5 GHz and 6 GHz.

25. A vehicle according to claim 16, wherein the processor is configured to initiate an action if the determined headlight status of the vehicle indicates that the headlights of the vehicle are off and the received headlight status of a predetermined number of other vehicles indicates that the headlights of the predetermined number of other vehicles are on.

26. A vehicle according to claim 25, wherein the predetermined number of other vehicles is three vehicles.

27. A vehicle according to claim 16, wherein the processor is configured to initiate an action if the determined headlight status of the vehicle indicates that the headlights of the vehicle are off and the received headlight status of a predetermined percentage of the at least one other vehicle indicates that the headlights of the predetermined percentage of the at least one other vehicle are on.

28. A vehicle according to claim 16, wherein the communication area corresponds to an area surrounding the vehicle in which the receiver is capable of receiving status information from another vehicle.

29. A vehicle according to claim 16, wherein the status information of the at least one other vehicle further includes a location and a velocity.

30. A vehicle according to claim 29, wherein the status information of the at least one vehicle further includes vehicle dimensions.

31. A vehicle according to claim 16, further comprising:
    a transmitter that transmits status information from the vehicle to at least one other vehicle located in a communication area surrounding the vehicle, the transmitted status information including the determined headlight status of the vehicle.

32. A vehicle configured to control a headlight status, comprising:
    headlights configured to be on or off;
    a receiver that receives status information from at least one other vehicle located in a communication area surrounding the vehicle, the status information including a headlight status of the at least one other vehicle; and
    a processor configured to initiate an action based on the received status information of the at least one other vehicle.

* * * * *